United States Patent
Thompson

[15] 3,654,839
[45] Apr. 11, 1972

[54] PISTON AND ROD ASSEMBLY
[72] Inventor: Glenn S. Thompson, Brown Deer, Wis.
[73] Assignee: Koehring Company, Milwaukee, Wis.
[22] Filed: Mar. 6, 1970
[21] Appl. No.: 17,125

[52] U.S. Cl..................................................92/200, 92/256
[51] Int. Cl.................................................F01b 13/04
[58] Field of Search...................92/198, 200, 244, 255, 256, 92/251, 252, 253, 254; 277/154, 162, 178

[56] References Cited

UNITED STATES PATENTS

| 3,426,656 | 2/1969 | Bimba | 92/255 |
| 3,426,657 | 2/1969 | Bimba | 92/255 |
| 1,232,305 | 7/1917 | Heft | 277/162 |
| 2,452,832 | 11/1948 | Carter | 277/178 |
| 3,066,001 | 11/1962 | Zimmerman | 92/244 |
| 3,165,032 | 1/1965 | Konkle | 92/252 |
| 3,233,907 | 2/1966 | Stanton | 277/178 |
| 3,457,842 | 7/1969 | Tennis | 92/256 |

Primary Examiner—Martin P. Schwadron
Assistant Examiner—Ronald H. Lazarus
Attorney—Ira Milton Jones

[57] ABSTRACT

A single split ring retainer is cooperable with abutments on a rod encircled thereby and with other abutments on an annular piston seated on the rod to establish an axial thrust transmitting connection between the piston and rod. The thrust transmitting connection is maintained effective only as long as the retainer is held against lateral displacement from the rod by the wall of the cylinder for which the assembly is intended.

5 Claims, 7 Drawing Figures

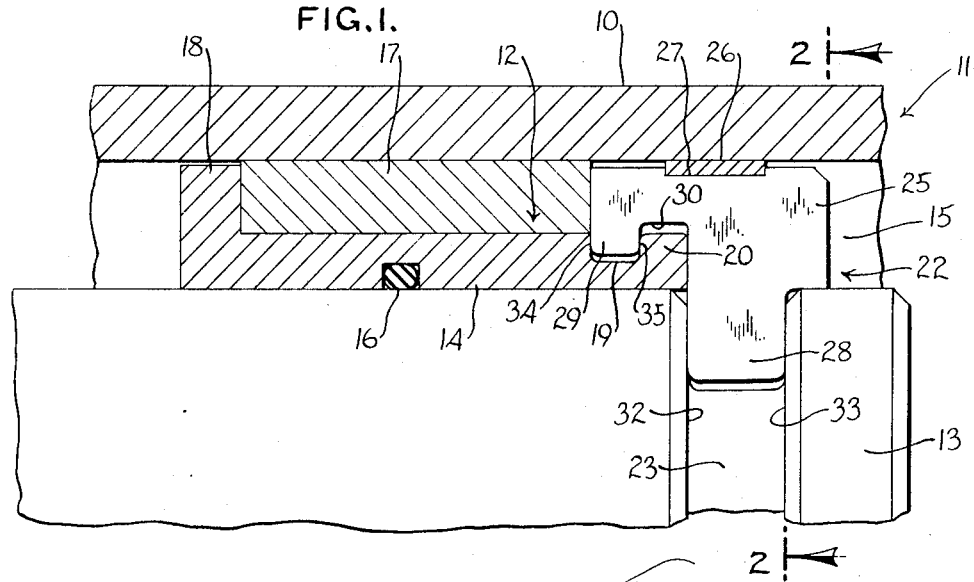
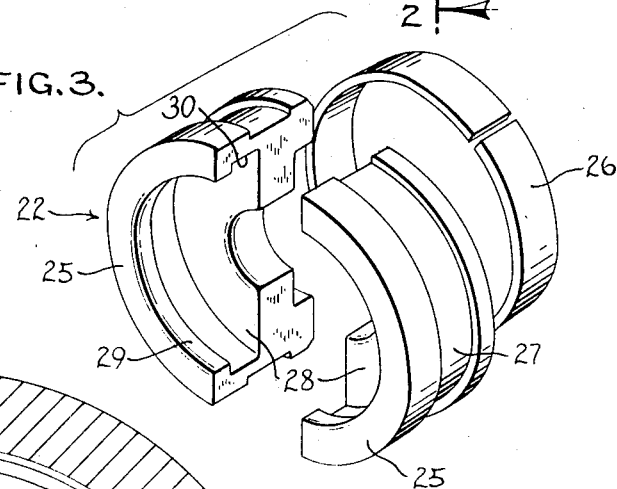
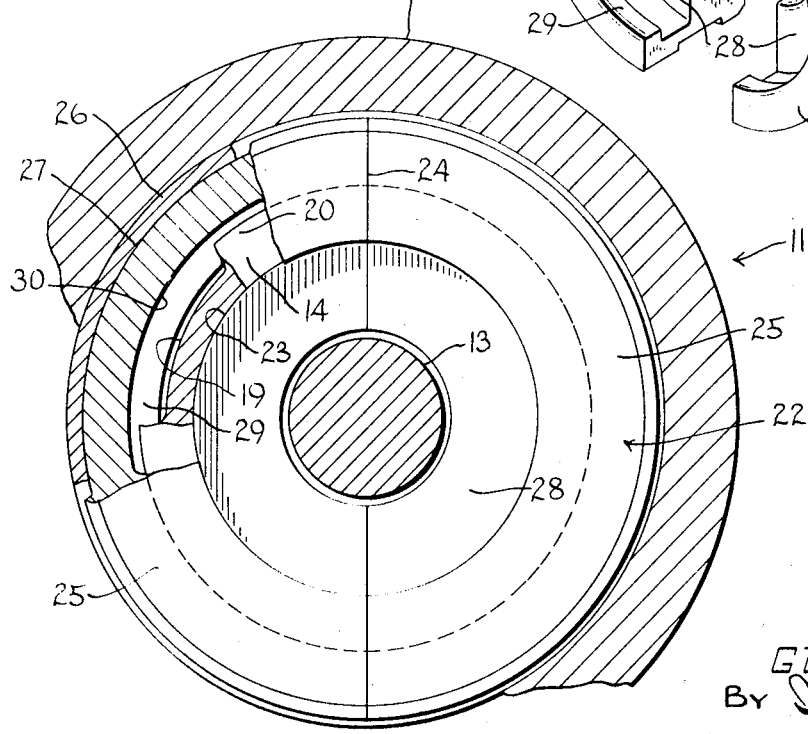
INVENTOR
Glenn S. Thompson
BY
ATTORNEY

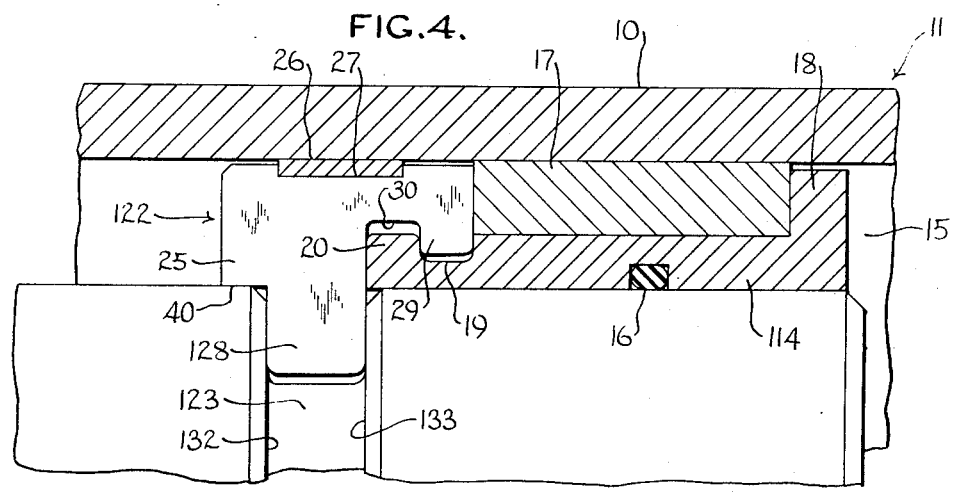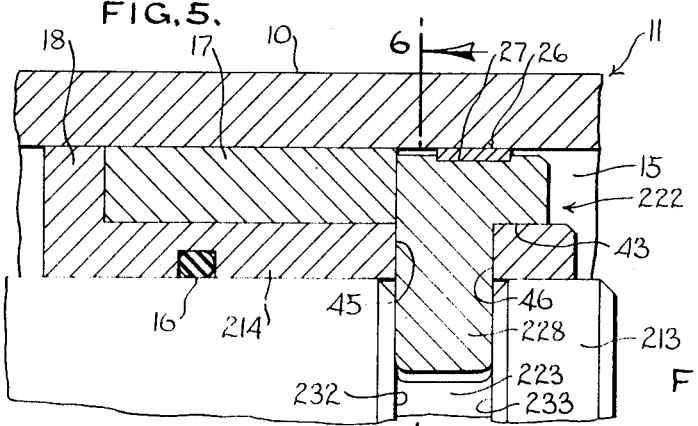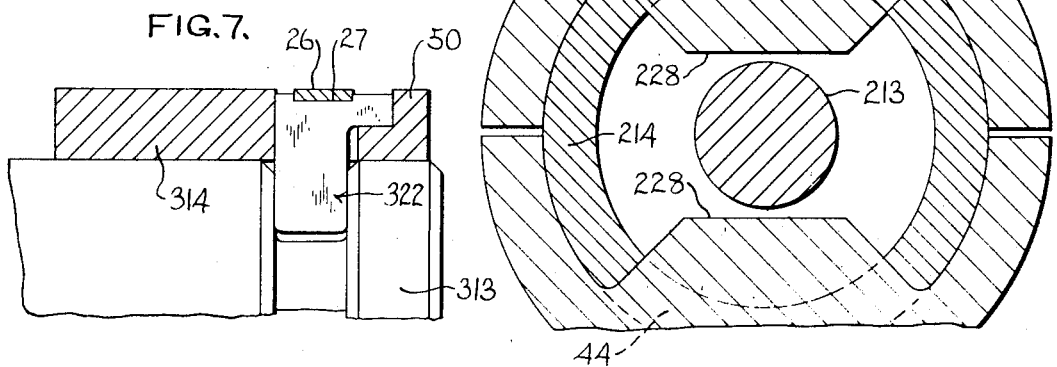

PISTON AND ROD ASSEMBLY

BACKGROUND OF THE INVENTION

This invention relates to piston and rod assemblies for hydraulic cylinders and the like, wherein an annular piston encircles the rod and has an axial thrust transmitting connection therewith designed to obviate the need for screw threaded fastening means such as were commonly used for that purpose in the past.

An example of that type of piston and rod assembly can be found in the U.S. Pat. to F. H. Tennis, No. 3,457,842, issued July 29, 1969. As therein disclosed, a plurality of split rings encircling the rod with inner portions confined in axially spaced circumferential grooves in the rod and outer portions abutting the opposite ends of the piston were provided to drivingly connect the latter to the rod. The wall of a cylinder containing the assembly was alone relied upon to hold the split rings against lateral displacement from the rod.

SUMMARY OF THE INVENTION

The purpose of this invention is to provide simplified and improved means for establishing an axial thrust transmitting connection between an annular piston and a piston rod encircled thereby without entailing the use of tools or relying upon screw threaded means of any kind; and its object is to achieve that end through the employment of but a single split ring interconnected with the rod and the piston in a way that does not interfere with lateral displacement of the ring from the rod whenever it is free of the restraint placed upon it by the wall of the cylinder for which the assembly is intended.

With these observations and objects in mind, the manner in which the invention achieves its purpose will be appreciated from the following description and the accompanying drawings.

BRIEF DESCRIPTION OF THE DRAWINGS

FIG. 1 is a view partially in elevation and partly in longitudinal section of a portion of a cylinder equipped with a piston and rod assembly of this invention;

FIG. 2 is a cross sectional view taken through FIG. 1 on the line 2—2, with portions broken away to show underlying structure;

FIG. 3 is a perspective view, on a reduced scale, of the split ring type piston retainer employed in FIGS. 1 and 2, but with its component parts separated;

FIG. 4 is a view similar to FIG. 1, illustrating how the piston can be anchored to its rod at the extreme end thereof;

FIG. 5 is a view similar to FIG. 1 but illustrating another embodiment of the invention;

FIG. 6 is a cross sectional view taken on the line 6—6 of FIG. 5; and

FIG. 7 is a sectional view similar to FIG. 5 but showing a further modification of the invention.

DESCRIPTION OF THE PREFERRED EMBODIMENTS

Referring now more particularly to the drawings, the numeral 10 designates a portion of the wall of a hydraulic cylinder 11 which houses an assembly 12 comprising an axially reciprocable piston rod 13, and a piston 14 carried by the inner end portion of the rod. The piston 14 is provided by a metal annulus or sleeve which substantially closely encircles the rod 13 and is confined in the space 15 between the rod and the wall 10 of the cylinder.

As is customary, the piston 14 must have sealing engagement with the exterior of its rod 13 and with the inner surface of the cylinder wall 10 along which it slides during extension and retraction of the piston rod. Hence, at least one O-ring seal 16 is interposed between the exterior of the rod and the bore of the piston 14, with the seal confined in a circumferential groove in one of said parts to prevent leakage of fluid past the piston along the exterior of the rod.

Sealing of the piston along the cylinder wall can be effected by means of piston rings, or by means of an annular V-section sealing member 17 seated on the piston, and shown somewhat diagrammatically in FIGS. 1 and 4. One end of the sealing member abuts an upstanding circumferential flange 18 on the piston.

Near its opposite end, the piston of the FIG. 1 embodiment of the invention is provided with a circumferential groove 19 that opens to its periphery and defines an upstanding annular flange 20 at the extremity of the piston. Though the piston has a substantially close fit on the exterior of its rod 13, it must nevertheless be firmly anchored thereto so as to assure against axial movement of the piston relative to the rod. For that purpose, a single annular retainer 22 is provided. The retainer encircles the rod and cooperates with the groove 19 and flange 20 on the piston, and also with a grooved portion 23 on the rod to drivingly connect the piston thereto.

The retainer 22 is in the form of a circumferentially interrupted annulus, or split ring here shown as severed along a diameter thereof, as at 24, and having its periphery contiguous to the cylinder wall. It thus comprises two complementary halves 25 which, in the present case, are identical. The ring halves are laterally displaceable off of the rod 13 to opposite sides thereof, but they are normally held against such displacement by the surrounding cylinder wall. A circumferentially interrupted band 26 of bearing material can be snapped into a shallow groove 27 in the periphery of the split ring, if desired, to not only prevent scoring of the cylinder wall but to also hold the ring in an operative condition encircling the rod prior to insertion of the assembly into the cylinder.

The split ring halves are applied to the rod with a concentric semicircular rib 28 on the interior of each engaging in the grooved portion 23 of the rod to hold the retainer against axial movement relative to the rod. A radially inwardly directed annular flange 29 provided on one axial end of the ring and which engages in the groove 19 of the piston can then anchor the latter to the rod. The flange 29 is defined by a radially inwardly opening circumferential groove 30 in the ring, of a depth and width to snugly receive the flange 20 on the piston.

The purpose of the grooved portion 23 of the rod, which can extend entirely around the rod, is to provide spaced apart abutments having surfaces 32 and 33 which oppose one another and face in opposite axial directions. Similarly, it can be said that the groove 19 in the piston defines other abutments having surfaces 34 and 35 which face in opposite axial directions. The retainer 22 is inter-connected with the rod and piston abutments by its ribs 28 and by the flange 29 in such a way as to provide an axial thrust transmitting connection between the piston and the rod which can be maintained as long as the assembly is in place within the cylinder, but which connection is readily disruptable upon lateral displacement of the split ring halves from the rod after the assembly is removed from the cylinder.

To be effective for the transmission of the axial thrust from the piston to the rod, the ribs on the ring halves should substantially closely fit the groove 23 in the rod. In other words, the sides of the ribs should be in axial thrust transmitting relation with the surfaces 32–33 on the rod abutments. For the same reason, the flange 29 on the ring should substantially closely fit the groove 19 in the piston and thus be in axial thrust transmitting relation to the surfaces 34–35 of its abutments. Alternatively, axial thrust can be transmitted from the piston to the split ring through the opposite sides of the piston flange 20 and the opposing sides of the groove 30 in which the flange is received, as seen in FIG. 4. In this respect, it should also be noted that the split ring 22 can be engaged by the adjacent end of the piston sleeve 14 to provide a thrust transmitting connection between said members effective to move the rod to the right as seen in FIG. 1 when force is applied to the left hand end of the piston. These directions are the reverse in the FIG. 4 embodiment of the invention.

With the piston mounted close to but spaced from the inner end of its rod 13 as seen in FIG. 1, the circumferential groove 23 must be formed in the rod a distance from its extremity; and the grooved and flanged end of the piston can be located directly alongside the groove 23. However, it will be appreciated that the piston can be mounted anywhere along the length of the rod merely by cutting a groove in the rod adjacent to the desired piston location.

This invention also permits mounting of the piston at the extreme inner end of the rod, to thereby give the advantage of the longest possible stroke of the piston and rod assembly. Location of the piston at the extremity of its rod was impossible heretofore, wherever the piston was fitted on a reduced and threaded end portion of the rod and clamped axially between a shoulder at the base of the reduced end of the rod and a nut threaded thereonto. Consequently, the piston could never approach any closer to the end of the cylinder than was permitted by the nut holding it on the piston rod.

When the piston is mounted at the extremity of its rod, as seen in FIG. 4, the split ring retainer 122 is placed at the end of the piston 114 remote from the extremity of the rod. It's ribs 128, of course, similarly engage the opposing surfaces 132–133 of abutments defined by a circumferential groove 123 in the rod.

Both of the embodiments described thus far feature anchoring of an annular piston on the piston rod of a cylinder by means of a split ring retainer that seats on and is supported by the piston rod. In both cases, the end of the split ring retainer remote from the piston is counterbored to provide an internal cylindrical wall 40 which engages around the exterior of the rod adjacent to the groove therein.

In the embodiment of the invention seen in FIG. 5, however, the split ring retainer 222 has a larger counterbore therein to define an internal cylindrical wall 43 that engages over the piston sleeve 214 to be supported by the latter. In this case also, the piston 214 differs somewhat from those described earlier in that it extends over the groove 223 in the end portion of the piston rod 213 and a distance beyond the axially opposing surfaces 232–233 of the groove. It is for this reason that openings 44 are formed in the sleeve, at diametrically opposite locations in register with the groove 223, to enable a lug 228 on each ring half to pass down into the groove 223 through said openings 44. The spacing between the axially opposed sides 45–46 of the openings can be approximately the same as the axial dimension of the groove 223 in the rod, in order for the lugs 228 to properly anchor the piston to the rod.

The lugs 228 on the split ring retainer 222 do not complement one another in the provision of a substantially annular rib as is the case in the previously described embodiments. Instead, they extend radially inwardly toward one another from diametrically opposite portions of the retainer, at opposite sides of the diameter along which the ring is split. In addition, the circumferential ends of the lugs can be formed to converge substantially radially inwardly, as shown, to facilitate the application of the complementary ring halves to the rod as well as their displacement from the rod.

FIG. 7 indicates how an annulus 314, which may also be in the nature of a piston, can be anchored to the piston rod 313 by means of a split ring retainer 322 like that seen in FIG. 5, wherein the retainer seats upon and is supported by the annulus 314. As therein shown, however, the annulus has an upstanding circumferential flange 50 at one end to confine the split ring axially between it and the other end portion of the annulus.

Also, the openings in the annulus can be slightly larger, so that the ring has thrust transmitting engagement with only the edges 145 of the openings; while the engagement between the split ring and the flange 50 provides for transmission of thrust in the opposite direction.

In all of the embodiments shown, it will be appreciated that the circumferentially interrupted annular retainer can have the piston member formed as an integral part thereof and thus similarly comprised of complementary piston sections. In this case, piston rings or other sealing means encircling the piston member and seated in grooves in its periphery can hold the circumferentially interrupted parts pre-assembled on the rod.

From the foregoing description, together with the accompanying drawings, it will be apparent to those skilled in the art that this invention provides a unique self-securing piston and rod assembly for a cylinder featuring anchoring of the piston to the rod by means of a single circumferentially interrupted retainer.

Those skilled in the art will appreciate that the invention can be embodied in forms other than as herein disclosed for purposes of illustration.

The invention is defined by the following claims:

1. A piston and rod assembly for a cylinder, characterized by:
   A. annular means encircling the rod and defining a piston adapted for sliding and sealing engagement with the wall of a cylinder for which the assembly is intended;
   B. first and second abutment means on the rod and piston, respectively, each said abutment means having surfaces facing in opposite axial directions;
   C. an annular retainer encircling the rod and portions of the piston at a location adjacent to said second abutment means and having a diameter substantially equal to that of the piston, said retainer being circumferentially interrupted to provide for lateral displacement thereof from an operative position encircling the rod; and
   D. means on the retainer projecting inwardly therefrom toward the rod and interconnecting with said first and second abutment means, in axial thrust transmitting engagement with said surfaces thereof, to hold the piston against axial movement relative to the rod.

2. The piston and rod assembly of claim 1, further characterized by:
   A. the piston comprising a sleeve having diametrically opposite openings in its wall providing said abutment means on the piston;
   B. the rod having a grooved portion which registers with said openings in the sleeve to provide said abutment means on the rod;
   C. the retainer encircling and being supportingly seated on said sleeve; and
   D. lugs on the retainer projecting inwardly therefrom and engaged in said holes and in the grooved portion of the rod to provide said interconnecting means on the retainer.

3. The piston and rod assembly of claim 1, wherein the retainer encircles one portion of the piston and is axially confined between other portions of the piston.

4. A piston and rod assembly for a cylinder, characterized by:
   A. means providing an annular piston which encircles the rod and has one axial end disposed substantially flush with one extremity of the rod;
   B. an annular retainer encircling the rod adjacent to the other end of the piston, said retainer being circumferentially interrupted to provide complementary arcuate sections which are laterally displaceable from the rod but are adapted to be held against such displacement by the wall of a cylinder for which the assembly is intended; and
   C. means on the retainer interconnected in axial thrust transmitting engagement with portions of the rod and the piston to hold the latter against axial movement relative to the rod.

5. A piston and rod assembly for a cylinder, characterized by:
   A. annular means encircling the rod and defining a piston adapted for sliding and sealing engagement with the wall of a cylinder for which the assembly is intended;
   B. first and second abutment means on the rod and piston, respectively, each said abutment means having surfaces facing in opposite axial directions;
   C. said second abutment means being defined by a groove in the piston opening to its periphery adjacent to one end of the piston;
   D. an annular retainer encircling the rod at a location adjacent to the piston, said retainer seating on and being supported by the rod, and being circumferentially interrupted to provide for lateral displacement thereof from an operative position encircling the rod; and E. means on the retainer interconnecting with said groove and first abutment means, in axial thrust transmitting engagement with said surfaces thereof, to hold the piston against axial movement relative to the rod, said last named means comprising an internal flange on the retainer extending into and filling said groove in the piston.

* * * * *